(12) United States Patent
Burton et al.

(10) Patent No.: US 7,562,647 B2
(45) Date of Patent: Jul. 21, 2009

(54) INLET VALVE HAVING HIGH TEMPERATURE COATING AND INTERNAL COMBUSTION ENGINES INCORPORATING SAME

(75) Inventors: David R. Burton, Salt Lake City, UT (US); Jeffrey C. Holm, Sandy, UT (US); James M. Yates, Sandy, UT (US)

(73) Assignee: High Performance Coatings, Inc., Bluffdale, UT (US)

( * ) Notice: Subject to any disclaimer, the term of this patent is extended or adjusted under 35 U.S.C. 154(b) by 450 days.

(21) Appl. No.: 11/394,291

(22) Filed: Mar. 29, 2006

(65) Prior Publication Data
US 2007/0240668 A1    Oct. 18, 2007

(51) Int. Cl.
F02N 3/00    (2006.01)
(52) U.S. Cl. .................... 123/188.3; 137/375; 29/888.4; 251/368
(58) Field of Classification Search .............. 123/188.1, 123/188.2, 188.3, 188.8, 188.11, 670, 568.13; 29/888.4, 888.46, 888.048; 164/DIG. 13; 251/368, 318; 137/375
See application file for complete search history.

(56) References Cited

U.S. PATENT DOCUMENTS

| | | | |
|---|---|---|---|
| 2,273,250 A | | 2/1942 | Charlton |
| 4,055,705 A | | 10/1977 | Stecura et al. |
| 4,222,430 A | * | 9/1980 | Lindner ........................ 164/61 |
| 4,476,150 A | | 10/1984 | Rose |
| 4,530,322 A | | 7/1985 | Yamada et al. |
| 4,554,897 A | | 11/1985 | Yamada et al. |
| 4,554,898 A | | 11/1985 | Yamada et al. |

(Continued)

FOREIGN PATENT DOCUMENTS

DE    35107077 C1  *  11/1986

(Continued)

OTHER PUBLICATIONS

Lee, Ceramic Engineering and Science Proceedings v 20 n 3 1999.p. 145-152, Proceedings of the 1999 23$^{rd}$ Annual Conference on Composites, Advanced Ceramics, Materials, and Structures, 2000(13):3717 Compendex.*

(Continued)

*Primary Examiner*—Stephen K. Cronin
*Assistant Examiner*—Hyder Ali
(74) *Attorney, Agent, or Firm*—Workman Nydegger (57) ABSTRACT

An inlet valve is partially coated with a protective coating to resist corrosion and gas impingement when used in an internal combustion engine. The inlet valve has a hard cladding that is shaped to function as a valve seat. The hard cladding forms an interface with the valve head body, which is typically made of a softer metallic material than the hard cladding. The protective coating is bonded to the inlet valve and covers the cladding-body interface. The protective coating is resistant to corrosion, wear from gas impingement, and can withstand the high temperatures reached in internal combustion engines. Internal engines incorporating the valves are more durable and less susceptible to catastrophic valve failure. A method for making the inlet valves generally includes masking a portion of the valve stem and the valve seat, applying a protective coating to cladding-body interface, and curing the protective coating or otherwise bonding the protective coating to the inlet valve.

20 Claims, 5 Drawing Sheets

U.S. PATENT DOCUMENTS

| | | | |
|---|---|---|---|
| 4,686,348 A | 8/1987 | Johns et al. |
| 4,787,736 A | 11/1988 | Mori et al. |
| 5,084,113 A | 1/1992 | Mori et al. |
| 5,576,069 A | 11/1996 | Chen et al. |
| 5,655,493 A | 8/1997 | Enright et al. |
| 5,662,078 A | 9/1997 | Adegawa |
| 5,688,564 A | 11/1997 | Coddet et al. |
| 5,759,640 A | 6/1998 | Mannava et al. |
| 5,799,683 A | 9/1998 | Hamada et al. |
| 5,823,158 A | 10/1998 | Heinmann, Jr. et al. |
| 6,129,954 A | 10/2000 | Spitsberg et al. |
| 6,238,847 B1 | 5/2001 | Axtell, III et al. |
| 6,257,190 B1 | 7/2001 | Linebarger |
| 6,296,909 B1 | 10/2001 | Spitsberg et al. |
| 6,296,910 B1 | 10/2001 | Choy et al. |
| 6,298,817 B1 | 10/2001 | Hoeg |
| 6,443,115 B1 | 9/2002 | Hoeg |
| 6,541,075 B2 | 4/2003 | Hasz et al. |
| 6,660,090 B2 | 12/2003 | Choy et al. |
| 6,694,961 B2 | 2/2004 | Miura et al. |
| 6,753,090 B2 | 6/2004 | Haug et al. |
| 6,866,031 B2 * | 3/2005 | Spiegel et al. | 123/668 |
| 7,011,067 B2 * | 3/2006 | Savel et al. | 123/188.3 |
| 2004/0105939 A1 | 6/2004 | Haug et al. |
| 2004/0138058 A1 | 7/2004 | Sambasivan et al. |

FOREIGN PATENT DOCUMENTS

JP           62007909 A   *   1/1987

OTHER PUBLICATIONS

Engleman, P.G., Surface Engineering v 18 n 2 2002.p. 113-119, 2003(5):783 Compendex.*

Herzog, CFI Ceramic Forum International v 79 n 8 August 2002.p. D15-D17+E14-E16; 2002(38):3338 Compendex.*

Buyukkaya, E., Key Engineering Materials v. 264-268 n 1 2004.p. 517-520, Proceeding of the 8th Conference and Exhibition of the European Ceramic Society, 2004(49):6796 Compendex.

Kawana, A., Surface & Coatings Technology v 86-87 n 1-3 pt 1 Dec. 1, 1996.p. 212-217, Proceedings of the 1996 23rd International Conference of Metallurtical Coatings and Thin Films, 1997(13):2038 Compendex.

* cited by examiner

INLET VALVE HAVING HIGH TEMPERATURE COATING AND INTERNAL COMBUSTION ENGINES INCORPORATING SAME

BACKGROUND OF THE INVENTION

1. The Field of the Invention

The present invention relates to inlet valves used in internal combustion engines. More particularly, the present invention relates to inlet valves coated with a high temperature coating and internal combustion engines incorporating same.

2. Related Technology

Internal combustion engines are used in many different applications, such as automobiles, ships, electric generators, pumps, among others. Inlet valves are a common component of many internal combustion engines. The inlet valves are positioned in an inlet port to close the air intake during combustion. During the air intake stroke, a cam pushes the inlet valve open and allows the fuel mixture to enter the combustion chamber.

The seal that the inlet valve makes with the inlet port is important to engine performance and efficiency. If the valve leaks the pressure in the combustion chamber decreases and the engine generates considerably less power. Engine manufacturers over the last few decades have dedicated substantial efforts in designing inlet valves that can form a tight seal with the valve seat of the inlet port.

Figure 1:
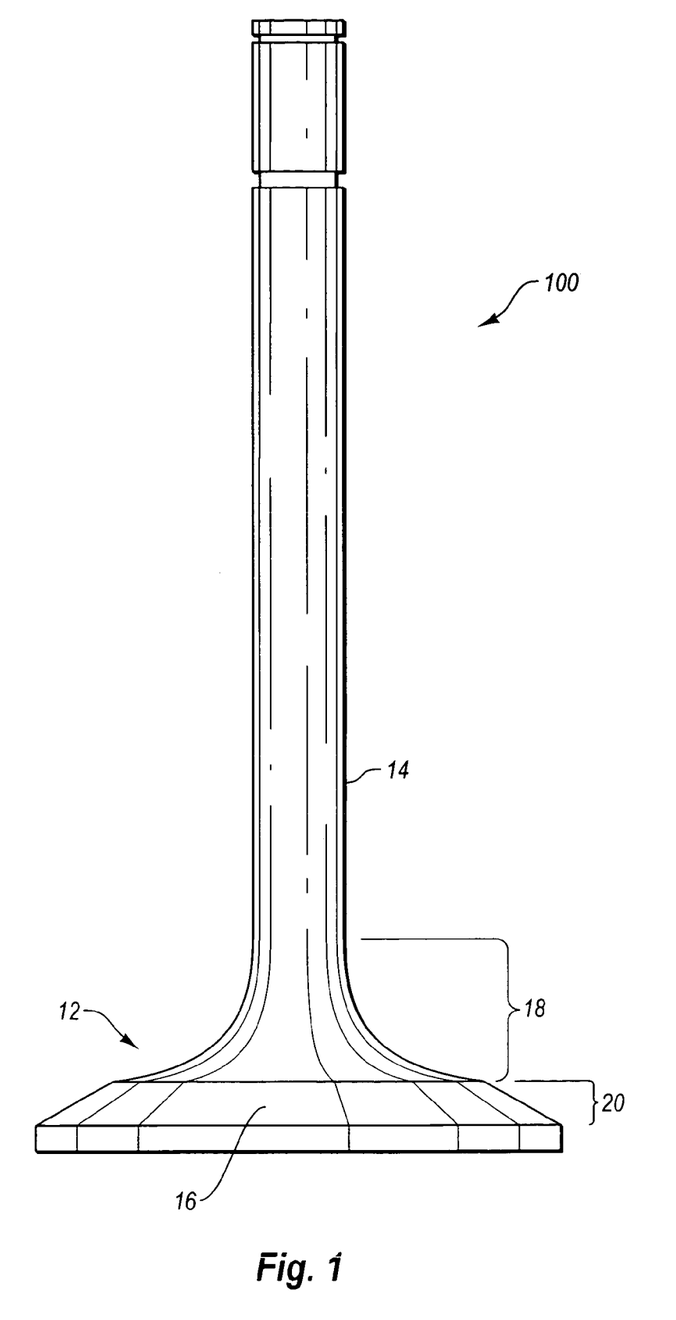
FIG. 1 is an elevational view of an exemplary inlet valve without a protective coating.

FIG. 1 shows a typical inlet valve 10. The body of inlet valve 10 includes a valve head 12 and a valve stem 14. The valve head 10 has a valve seat 16 that is shaped and configured to engage an inlet port to seal a combustion chamber. The valve seat is particularly crucial for the reliability of the inlet valve. It is well-known that corrosion of the seat face can cause the valve to leak when the valve is closed, which results in "burn through."

To prevent burn through, the valve seats on the inlet valve and the inlet port have been made with increasingly harder materials. The valve seat is made harder by applying a hard cladding layer on the valve head and machining to make the valve seat. The hard cladding makes the valve seat 16 more wear-resistant and reduces the formation of dent marks. Examples of materials that are frequently used for valve seat materials are metal alloys having cobalt and nickel (e.g., Stellite).

The use of extremely hard materials for valve seats has dramatically improved the performance and durability of inlet valves. However, in almost all cases, the advantages of using these hard materials throughout the valve (e.g., in the valve stem and other parts of the valve head) are not sufficient to offset the increase in price over softer metals such as low carbon steel. Consequently the valve stem 14 and the bell region 18 between the seat face 20 and the valve stem 14 are typically made from low carbon steel.

Improvements in the durability of the seat face of inlet valves has allowed inlet valves to hold up under more severe conditions and for longer periods of time than previous inlet valves. In many cases, the seat face is no longer the location where the valve fails. One point of failure observed in inlet valves occurs at the interface where the hard seat material ends and the softer steel of the valve body begins. Gas impingement and/or corrosion can pit or otherwise wear down the material in the valve body over extended periods of time. Wear is particularly likely to happen at the interface because of the transition between the two types of metals and the superior quality of the valve seat material.

Failure at the interface between the harder seat material and the softer valve body material is particularly problematic in engines that use exhaust gas recirculation (EGR). EGR is used to recycle gases that have high quantities of unburned particulate, $NO_x$, and/or $SO_x$ back into the combustion chamber to be reburned. The hot and corrosive exhaust gases are mixed with outside air and enter the combustion chamber by passing around the valve head of the inlet valve. Consequently, the recycled exhaust gases come into contact with the bell region 18 of the inlet valve 10. Furthermore, condensation during shutdown can cause pooling of corrosive liquids such as sulfuric acid on the valve. Corrosion and/or gas impingement can weaken bell region 18, and in particular the valve body material at the interface with the hard seating material. Even where a portion of the bell is coated as in U.S. Pat. No. 5,662,078, corrosive gases in contact with the valve body material at the seat-material, body-material interface can cause pits and cracks to form that lead to valve failure at the interface.

BRIEF SUMMARY OF THE INVENTION

The present invention relates to inlet valves that use a hard cladding material to make the valve seat. It has been found that the interface between the cladding and the body of the valve head is particularly susceptible to wear from gas impingement and/or corrosion. The inlet valves of the present invention include a protective coating that covers the cladding-body interface to improve the durability of the inlet valve. This is particularly true in the case where the inlet gases are corrosive (e.g., gas from an EGR system that contains $NO_x$ and $SO_x$).

In an exemplary embodiment, the inlet valve includes a valve head connected to a valve stem. The valve head includes a valve head body comprising a metallic material and a cladding covering a portion of the valve head body. At least a portion of the surface of the cladding forms a valve seat. The cladding and the metallic material abut one another, thereby forming a cladding-body interface. A protective coating is bonded to the valve head and covers the cladding-body interface. The protective coating typically comprises a ceramic of one or more metal oxides, nitrides, and optionally doped with ground state metals.

In a preferred embodiment, the protective coating is wider than the cladding-body interface by at least about 5 thousands of an inch on both sides, more preferably at least about 15 thousands of an inch, and most preferably at least about 30 thousands of an inch on both sides of the interface. Extending the coating beyond the interface can be advantageous because it provides a barrier that is more difficult for hot gasses to penetrate. If the coating wears down over time, the excess overlap ensures that the full thickness of the coating must be worn through before the cladding-body interface will be exposed to hot corrosive gases. Another advantage of extending the coating beyond the cladding-body interface is to ensure that the cladding-body interface is adequately covered if there are variations in manufacturing tolerances. Typically the location of the edge of the coating is limited by tolerances available for a particular manufacturing technique. By extending the coating beyond the cladding-body interface, the cladding-body interface is more likely to be covered if the edge of the coating or the cladding-body interface deviates by an amount within the allowed tolerances.

Preferably the protective coating continuously overlaps the entire cladding-body interface. Covering the entire interface can be advantageous since a single pit or weak location in the valve head can lead to valve failure.

In an exemplary embodiment, the valve seat cladding comprises a hard metal alloy suitable for use as a valve seat material. Examples of suitable alloy materials include nickel and/or cobalt alloyed with one or more metals selected from the group of chromium, aluminum, tungsten, molybdenum, titanium, or iron. A commercially available suitable alloy is Stellite, which is a cobalt-chromium alloy. The cladding material is selected for its hardness and durability so as to be suitable for use as a valve seat material.

The valve head body and the valve stem can be made from any metal. In an exemplary embodiment, the valve head body and the valve stem are manufactured from steel, preferably low carbon steel, to minimize cost. Because the coating of the present invention can protect the valve head body and the stem from corrosive gasses, the valve head body and the valve stem can be manufactured from inexpensive materials such as low carbon steel. This is a tremendous improvement in the art as extremely low cost metals can be made highly resistant to heat and corrosion by applying a protective layer over the surface.

The present invention also includes internal combustion engines incorporating the coated inlet valves of the present invention. The engines of the present invention are more likely to last longer because of the durability of the valves. The durability of a valve in an internal combustion engine is particularly important since valve failure can be catastrophic to the engine. While some parts of an internal combustion engine can be simply replaced if they fail, the inlet valves will often cause irreparable damage to the engine if they fail. If an inlet valve fails, the broken parts can be sucked into the combustion chamber and are likely to damage the engine block and piston heads. Consequently engine life can be significantly shortened if the inlet valves fail. The durability of an internal combustion engine can also significantly and beneficially impact the value of an automobile, ship, generator, or other machinery incorporating coated valves of the present invention.

In another exemplary embodiment, the internal combustion engine of the present invention includes an exhaust gas recirculation system. The exhaust gas recirculation system includes an EGR valve that can redirect exhaust gases into the air intake of the internal combustion engine. The recirculated gases tend to be more corrosive than fresh air. These corrosive gases are particularly problematic because they tend to impinge at the interface between the hardened metal alloy of the seat and the softer, more corrosive metal of the valve body. Because the recirculated gases tend to be more corrosive, the use of the inlet valves of the present invention are particularly advantageous when used with an EGR system.

These and other advantages and features of the present invention will become more fully apparent from the following description and appended claims as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF EXEMPLARY EMBODIMENTS

I. Inlet Valves

The present invention relates to inlet valves in internal combustion engines. The inlet valves are at least in part made from an inexpensive metal that consequently is susceptible to corrosion, especially in the region near the valve seat where the valve seat material interfaces the valve body material. A protective coating is applied to the inlet valves to reduce wear and valve failure caused by gas impingement and/or corrosion.

A. Protective Coatings Covering Cladding-body Interface

Figure 2:
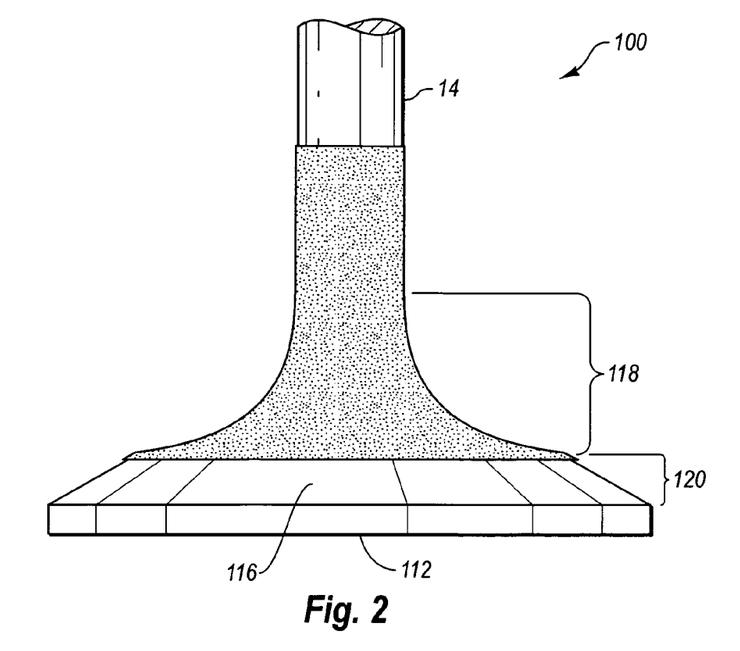
FIG. 2 is an elevational view of an exemplary inlet valve having a protective coating according to the present invention.

FIG. 2 shows an exemplary inlet valve 100 that has been surface coated according to the present invention. Inlet valve 100 includes a valve head 112 that is connected to valve stem 114. On the perimeter of valve head 112, the valve head 112 is shaped to form a valve seat 116. The valve seat 116 is part of seating face 120. A protective coating 122 is bonded (i.e., adhered) to the inlet valve. In an exemplary embodiment, the protective coating 124 covers the bell region 118, a portion of stem 114, and a portion of the seating face 120. It thus overlaps the interface between cladding layer 128 and valve body 126 as shown in FIG. 3.

Figure 3:
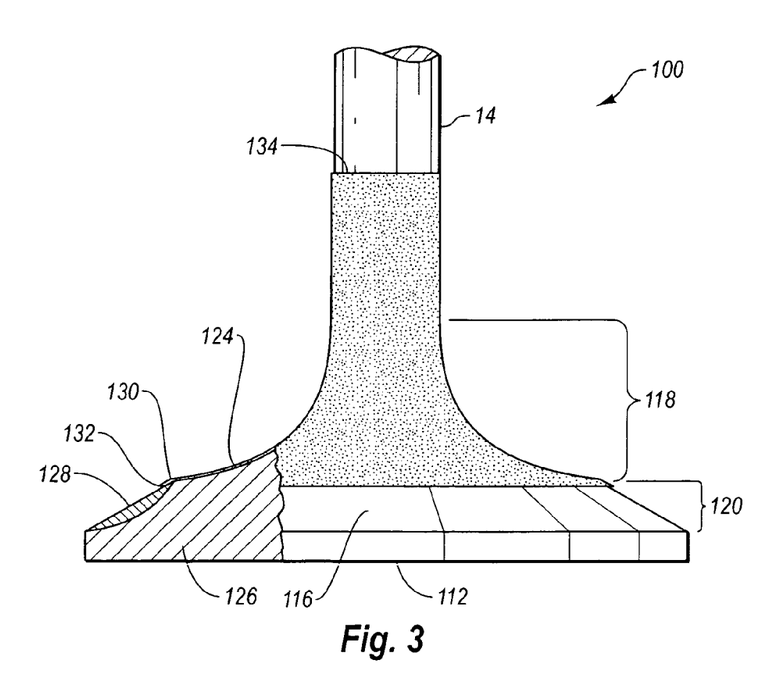
FIG. 3 is a partially sectioned view of the inlet valve of FIG. 2 showing a cladding layer and cladding-body interface.

FIG. 3 shows the exemplary inlet valve 100 with a portion of valve head 112 cut away to reveal the underlying structure of the valve head 112. Valve head 112 includes a valve body 126 and a cladding 128. Valve body 126 is made from a metallic material such as steel. Cladding 128 is made from a hard material suitable for use as a valve seat (e.g., Stellite). Valve body 126 and cladding 128 abut one another to form cladding-body interface 130 on the surface of valve head 112. If the inlet valve is circular, the cladding-body interface will tend to be a curved line that is concentric with the seating face 120. However, the cladding-body interface need not be concentric with seating face 120. Furthermore, valve head 112 can have shapes other than "bell-shaped." During use of inlet valve 100 in an internal combustion engine, cladding-body interface 130 will be situated on the inside of the inlet port (i.e., within the air intake) when the valve is in the closed position.

Protective coating 124 is positioned over interface 130 to protect interface 130 from corrosive gasses and liquids and from gas impingement. The coating can be any desired thickness so long as the thickness does not substantially interfere with valve movement or gas flow in the air intake. In a preferred embodiment, the coating thickness is in a range from about 0.0002 inches to about 0.002 inches. The desired thickness depends on the type of coating used and the amount of material needed to provide the desired protection. Relatively thin coatings are preferred due to the decreased cost and the increased simplicity with which they can be applied.

To cover cladding-body interface 130, a first edge 132 of protective coating 124 begins on cladding 128. First edge 132 overlaps cladding-body interface 130 by a desired amount. The distance between the first edge 132 and interface 130 depends on the tolerances associated with the valve seat 116, the tolerances associated with applying protective coating 124, and the potential for protective coating to wear during use. In a preferred embodiment, the first edge 132 begins on cladding 128 at least about 0.005 inches away from cladding-body interface 130, more preferably at least about 0.015 inches, and most preferably at least about 0.030 inches from cladding-body interface 130. In some cases, the valve may be very large (e.g. a valve head with a 12 inch diameter). In this case, the cladding may be substantially wider than the valve seat and the coating overlap may be substantially larger than 0.005 inches (e.g. 1 inch of overlap).

The protective coating 124 advantageously has a second edge that extends into the bell region so as to be at least about 0.005 inches away from the cladding-body interface, more preferably at least about 0.015 inches and more preferably at least about 0.030 inches. Even more preferably the protective coating 124 covers the entire bell region 118 and most preferably a portion of valve stem 114 such that the second edge 134 is positioned on valve stem 114. Typically the portion of the valve stem that will be in within a valve guide is not coated with the protective coating 124. Advantageously protective coating 124 extends from the cladding to the valve stem 114 so as to cover the entire surface of inlet valve 100 that is exposed to the gas path during use. Covering substantially the entire portion of the inlet valve 100 that is in the gas path can be advantageous because the second edge 134 will be out of the gas path and therefore less likely to receive wear from gas impingement or provide a location for the accumulation of condensed corrosive gases.

Extending protective coating 124 beyond cladding-body interface 130 is particularly advantageous for protecting inlet valve 100 against wear and failure, since the cladding-body interface 130 has been found to be particularly susceptible to weakening from corrosion and gas impingement in uncoated valves.

In most cases, protective coating 124 is not applied to valve seat 116. Valve seat 116 is the area of seating face 120 where inlet valve 100 is designed to seat during use. Typically valve seat 116 is a portion of seating face 120 near the middle of seating face 120. Seating face 120 is often wider than valve seat 116 to ensure that inlet valve 100 seats on seating face 120. Similarly, cladding 128 is typically wider than valve seat 116 to ensure that inlet valve 100 seats on cladding 128. First edge 132 of protective coating can be extended onto cladding 128 over any portion of cladding 128 that is not used to seat inlet valve 100. While protective coating 124 can be applied to valve seat 116, this approach may require further grinding of valve seat 116 and/or poor performance of the valve until coating 124 wears off of seating face 116 from use of inlet valve 100.

Figure 4:
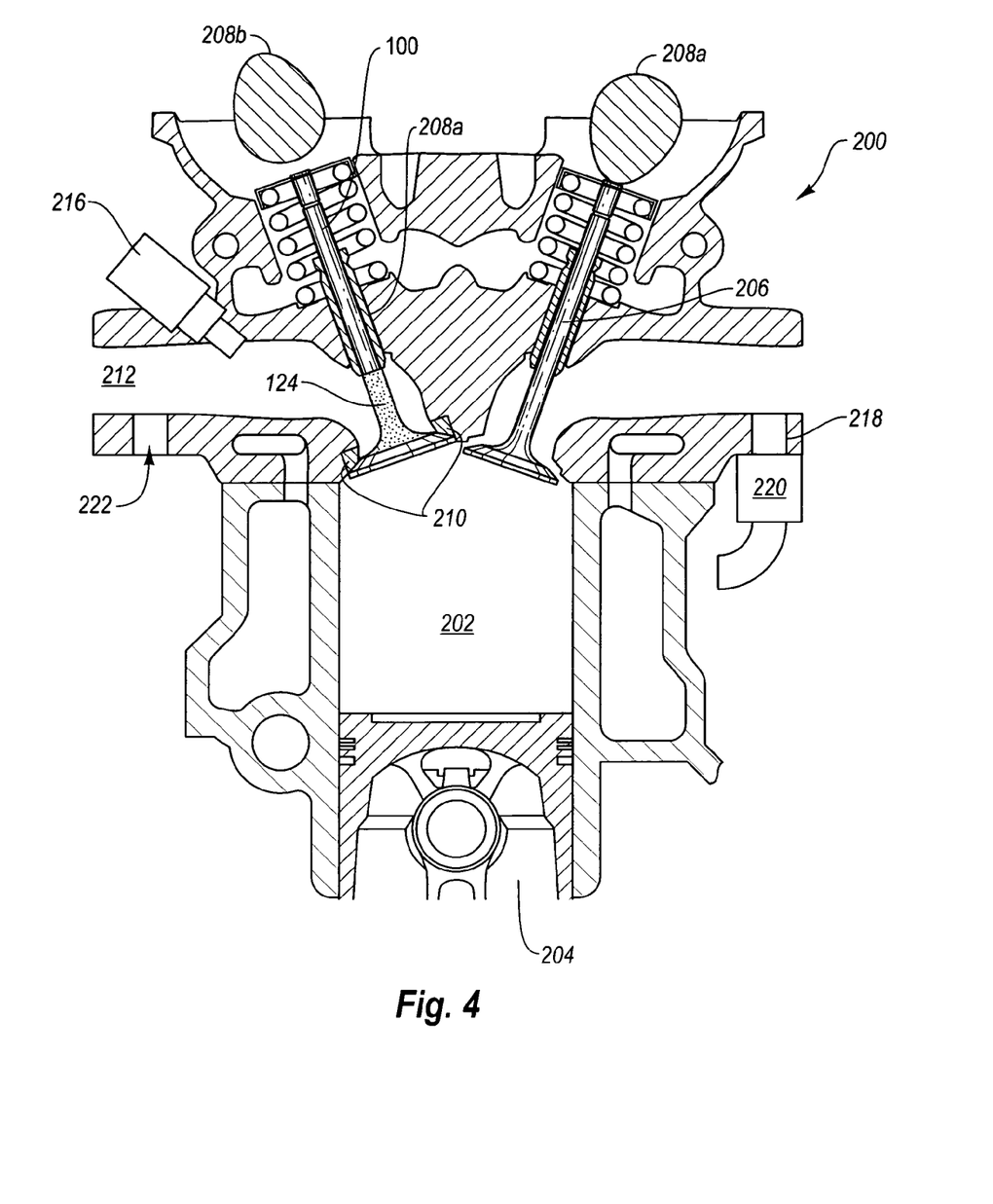
FIG. 4 is a schematic of an internal combustion engine having an EGR system and an inlet valve according to the present invention.

While FIGS. 2-4 show the edge of cladding 128 aligning with the edge of seating face 120, the invention is not limited in this regard. Seating face 120 is usually formed by applying an amount of cladding to a valve body and then grinding the cladding at a desired angle to form seating face 120. Whether the edge of the cladding layer aligns with the seating face depends on the shape of the cladding layer and the amount of cladding removed during grinding. While FIGS. 2-4 show protective coating 124 covering a portion of seating face 120, this is not necessary so long as cladding layer 120 extends far enough beyond seating face 120 such that protective coating 124 can overlap the interface by a desired amount (e.g., 0.005 inches).

The inlet valves of the present invention can be made from any metals suitable for use in an internal combustion engine. As described above, the cladding is a hard metal or metal alloy that gives the valve seat improved wear and resistance to corrosion and deformation. The cladding can have a single layer or more than one layer of hard corrosion resistant metals or metal alloys.

Examples of suitable materials for use as a cladding include nickel or cobalt alloys. In these alloys, the nickel or cobalt is typically the single greatest element by weight. Illustrative nickel based alloys include at least about 40 wt % Ni and at least one component from the group of cobalt, chromium, aluminum, tungsten, molybdenum, titanium, or iron. Examples of cobalt based alloys typically include at least about 30 wt % Co and at least one component from the group of nickel, chromium, aluminum, tungsten, molybdenum, titanium, or iron. Stellite is a well known cobalt-chromium alloy that is suitable for use as cladding in the present invention.

The valve head body 126 can be made of any metallic material, including softer metals that are normally susceptible to corrosion and/or substantial wear under the harsh conditions of an internal combustion engine. The metallic material, in contrast to the cladding, is a metal or metal alloy that is not readily used for its corrosion resistance, but has other beneficial properties such as low cost. In an exemplary embodiment, the valve head body is made from steel, preferably low-carbon steel.

The valve stem 114 can be made from any of the metallic materials suitable for making the valve head 112 and can be the same or a different metal than the metal used to make valve head 112. In a preferred embodiment, valve stem 112 is made from steel, preferably low carbon steel. Valve head 112 and valve stem 114 can be an integral piece or joined together using known techniques (e.g., welding).

FIGS. 2-4 show a disk-like valve head 112 and an annular seating face 120. This shape is very typical of inlet valves used in many internal combustion engines and has the advantage of facilitating air flow. However, the present invention also includes inlet valves having shapes other the disk-like.

B. Protective Coating Compositions

The protective coatings of the present invention can be any coating that can protect the metals of the valve body from corrosion and gas impingement. The protective coatings are typically selected to withstand temperatures and conditions within the air intake of the internal combustion engine. Because the air intake is adjacent the combustion chamber, the air intake can reach high temperatures (e.g., between about 300° C. to about 1000° C. The protective coating is also selected to resist corrosion in the presence of recirculated exhaust gases and/or gas impingement from gases moving through the air intake.

The protective coating can be any ceramic, metal, metal alloy, or combination thereof that can be bonded to the surface of the inlet valve and form a solid protective barrier to the underlying metal during normal engine operation. Those skilled in the art are familiar with the many different types of protective coatings that can be applied to metals to prevent corrosion and improve wear.

In an exemplary embodiment, the protective coating is initially a curable composition that can be applied to an inlet valve and then cured. In one embodiment, the exemplary curable compositions include the following three components: (i) at least one ceramic material or metal, (ii) at least one organic or inorganic binder, and (iii) at least one solvent.

A wide variety of ceramics and metals can be used in the protective coatings of the present invention. Examples of suitable materials include silicon, zinc, zirconium, magnesium, manganese, chromium, titanium, iron, aluminum, noble metals, molybdenum, cobalt, nickel, tungsten, and oxides thereof, and combinations thereof. In a preferred embodiment, the composition includes at least one metal oxide. Examples of suitable oxides include silica, calamine, zirconia, magnesia, titania, alumina, ceria, scandia, yttria, among others.

The binders used in the curable compositions of the present invention are typically organic or inorganic materials that can bind the metals or ceramics before or during sintering (i.e., curing). Examples of suitable organic binders such as ethylene copolymers, polyurethanes, polyethylene oxides, various acrylics, paraffin waxes, polystyrenes, polyethylenes, cellulosic materials, polysaccharaides, starch, proteins, "agar," and other materials. Suitable inorganic binders include silicon based binders such as soda silicate, kairome clay, titanium based binders such as titania sol and other inorganic binders such as aluminum phosphate.

Any solvent can be used to combine and/or deliver the metal and/or ceramic components so long as the solvent is compatible with the particular metals and/or ceramics and binders being used. Examples of suitable solvents include polar solvents such as water, methanol, and ethanol and non-polar organic solvents such as benzene and toluene.

The solvent, metal and/or ceramic particles and binder are mixed to form a solution, slurry, or paste that can be sprayed or brushed onto a substrate. In an exemplary embodiment, the coating comprises about 30 wt % to about 70 wt % metal oxide, about 0.5 wt % to about 20 wt % ground state metal, and about 10 wt % to about 30 wt % solvent. The coatings are cured by driving off the solvent and some or all of the binder.

In one embodiment, the binder and/or the metal or ceramic particles are selected to give the uncured coating composition high emissivity. Protective coating compositions that have high emissivity can be cured at relatively low temperatures using infrared radiation. The coating composition preferentially absorbs infrared energy, thus heating up, while low emissivity uncoated portions tend to reflect the infrared energy, thereby remaining cooler. In a preferred embodiment, the coating composition has an emissivity of greater than about 0.7, more preferably greater than about 0.9, and most preferably greater than about 0.95. The emissivity of a material can depend on the temperature. For purposes of the present invention, the emissivity value is based on the emissivity of the coating composition at the curing temperature.

The emissivity of the coating composition will depend on the all the components in the coating. Typically selection of the metal oxide has the most significant impact on the emissivity of the coating composition as a whole. Emissivity value for various suitable metal oxides is provided in Table 1.

TABLE 1

| Material | Temp (° C.) | Emissivity |
| --- | --- | --- |
| 20-Ni, 24-Cr, 55-Fe, Oxidized | 500 | .97 |
| Iron, Oxidized | 499 | .84 |
| Molybdenum, Oxidized | 371 | .84 |
| Nickel Oxide | 538-1093 | .59-.86 |
| Platinum, Black | 260 | .96 |

TABLE 1-continued

| Material | Temp (° C.) | Emissivity |
| --- | --- | --- |
| Titanium, Anodized onto SS | 93-316 | .96-.82 |
| Smooth Glass | 0-93 | .92-.94 |
| $Fe_2O_3$ | 24 | .91 |
| $Al_2O_3$ | 24 | .94 |
| ZnO | 24 | .95 |
| $MgCO_3$ | 24 | .91 |
| $ZrO_2$ | 24 | .95 |
| MgO | 24 | .91 |
| Glazed Silica | 1000 | .85 |

The high emissivity coatings can be cured using infrared radiation to heat the coating to a temperature in a range from about 100° C. to about 650° C., more preferably in a range from about 200° C. to about 550° C., and most preferably in a range from about 250° C. to about 450° C. Curing the protective coatings using infrared radiation can be advantageous because the coating can be cured rapidly with good uniformity. In addition, the relatively low temperatures needed to cure the high emissivity coatings minimizes the energy costs associated with curing, thereby improving the cost effectiveness of the process.

III. Internal Combustion Engines Incorporating Coated Inlet Valves

The present invention also includes internal combustion engines incorporating coated inlet valves such as inlet valve 100. As shown in FIG. 4, an internal combustion engine 200 includes a combustion chamber 202, a piston 204, an exhaust valve 206, and an inlet valve 100 having a protective coating according to the present invention. Cams 208a and 208b selectively open and close exhaust valve 206 and inlet valve 100 respectively during engine operation.

Inlet valve 100 is configured to engage inlet seat 210 to seal the combustion chamber from air intake 212. Valve 100 is actuated via cam 208b to open and close inlet port 214. Valve 100 is guided in its motion through valve guide 216.

Air intake 212 allows fresh air to be drawn into combustion chamber 202 when inlet valve 100 is in the open position. Fresh air is mixed with fuel from fuel injector 216 and enters the combustion chamber 202 through inlet port 214. The path defined by the air intake 212 is the gas path. A portion of inlet valve 100 is positioned in the gas path. The portion of inlet valve 100 in the gas path is the area between the valve seat and the portion of the stem that is outside the valve guide 216. In a preferred embodiment, inlet valve 100 has a protective coating covering the portion of inlet valve 100 that is within the gas path.

Engine 200 can be a gas engine a diesel engine, a flex fuel engine or any other type of engine that uses an inlet valve. Those skilled in the art will recognize that there are many different configurations of engines and engine types for which the inlet valves of the present invention will be advantageously incorporated.

In an exemplary embodiment, the engine 200 has an EGR system. The EGR system includes an EGR outlet 218 that receives exhaust gases when exhaust valve 206 is open during engine operation. In a typical EGR system exhaust gases are sampled using sensors and a central processing unit determines and/or monitors the amount of $NO_x$, $SO_x$, particulate, or other pollutant in the exhaust gases. The levels of pollutants in the exhaust gas can be reduced by recirculating exhaust gas back into the combustion chamber. The processor causes exhaust gases to be recirculated by opening EGR valve 220, which directs exhaust gases to EGR inlet 222. Recirculated exhaust gases entering EGR inlet 222 are mixed with the fresh air and drawn into combustion chamber 202.

As the recirculated exhaust gases are drawn into combustion chamber 202, the recirculated exhaust gases impinge on the portion of inlet valve 101 that is exposed in inlet. Coating 124 on inlet valve 100 protects inlet valve 100 from high velocity and/or corrosive gases in the gas path during combustion. Protecting the cladding-body interface and/or the bell region and/or the exposed stem region of inlet valve 100 can be particularly advantageous when recycled exhaust gases are introduced into the combustion chamber 202 since these gases are more likely to be corrosive.

Protective coating 124 can also protect inlet valve during shut down of the engine. During shutdown, corrosive gases can condense and pool on inlet valve 100. Condensed recirculated exhaust gases can be particularly corrosive due to the $NO_x$ and $SO_x$ compounds in these gases. Protective coating 124 resists the corrosion of the condensed vapor, thereby protecting inlet valve 100. Consequently, the engines of the present invention are more durable than engines having valves that are not coated.

The engines of the present invention can be incorporated into any known machinery or device that utilizes an internal combustion engine employing an intake valve. For example, the engines of the present invention are suitable for use in automobiles, ships, airplanes, heavy construction equipment, electric generators, and the like.

III. Methods of Coating Inlet Valves

The methods for coating valves according to the present invention generally include (i) providing an inlet valve that has a valve stem, a valve seat, and a cladding-body interface (ii) masking the valve seat and at least a portion of the valve stem, (iii) applying a metal and/or ceramic protective coating to an unmasked portion of the valve so as to cover the cladding-body interface; and (iv) curing or sintering the protective coating.

The inlet valves of the present invention can be coated using any known technique suitable for applying and bonding a metal and/or ceramic coating to a metal substrate. Examples of suitable methods include conventional spaying techniques, brushing, thermal spray techniques such as high-velocity oxy-fuel (HVOF), plasma spray techniques such as air plasma spray (APS), vacuum plasma spray (VPS), and low pressure plasma spray (LPPS), and vapor deposition techniques such as electron beam physical vapor deposition (EB-PVD).

The application of the protective coating to the inlet valve is controlled to ensure that the cladding-body interface is covered. Preferably the entire bell region of the valve head and a portion of the valve stem are coated with the protective coating.

Figure 5:
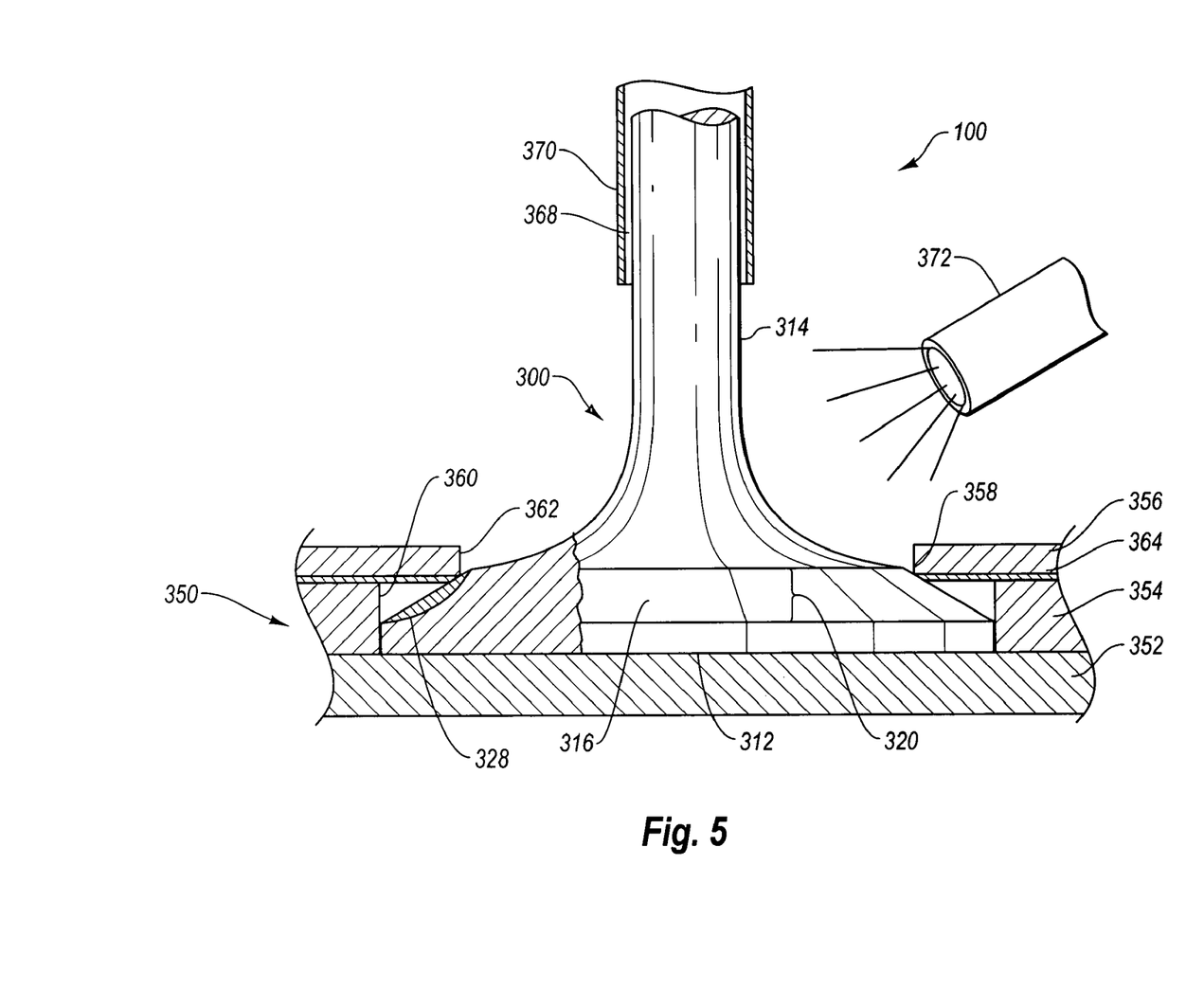
FIG. 5 shows an exemplary inlet valve and tooling for preparing the inlet valve to be coated with a protective coating.

In an exemplary embodiment, the inlet valves of the present invention are manufactured by masking the valve seat and a portion of the valve stem and then roughening the surface of the unmasked portion to prepare the surface for applying a protective coating. FIG. 5 shows exemplary tooling 350 that can be used to mask the valve seat 316 and a portion of the valve stem 314 of valve 300. Masking the valve seat and valve stem ensures that the valve seat 316 and valve stem 314 are not damaged during the manufacturing process.

The valve seat 316 is masked using three plates. A bottom plate 352 provides a support for valve 300 and the remaining plates. Spacer plate 354 provides spacing between bottom plate 352 and a masking plate 356. The thickness of spacer plate 354 is selected such that the bottom edge 358 of masking plate 356 is positioned on seat face 320 so as to cover valve seat 316.

Spacer plate 354 and masking plate 356 are made by precision cutting an aperture in a sheet of metal. The aperture 360 in spacer plate 354 is precision cut to fit around the outside diameter of valve head 312. The aperture 362 in masking plate 356 is precision cut to fit against the valve seat.

In one embodiment, the plates are designed to simultaneously mask a plurality of inlet valves. In this embodiment, a plurality of apertures are cut into spacer plate 354 and a plurality of apertures are cut into masking plate 356 such that a plurality of inlet valves can be prepared from a single plate.

Due to the small tolerances typically needed to precisely mask the valve seat, a compressible layer 364 can be positioned between masking plate 356 and spacer plate 354. Compressible layer 364 can provide good contact between spacer plate 354 and masking plate 356 even if the aperture in masking seat 356 is slightly small thereby causing masking plate 356 to sit higher on seating face 320. Alternatively, if spacer plate 354 is slightly to thin, compressible layer 364 can provide the additional spacing to properly position masking plate 356 on seating face 320. A plurality of clamps or similar devices can be used to compress the plates. Clamping the plates can be beneficial because it provides a tight seal to prevent grit or particulate from contacting the valve seat during grit blasting or another technique used to roughen the surface.

The valve stem 314 is partially masked using a sleeve 368. Sleeve 368 is closed at one end and the length of sleeve 368 is selected such that the sleeve ends along valve stem 314 where the protective coating is to be applied. Sleeve 368 is preferably made from a soft metal such as aluminum to prevent the sleeve from scratching valve stem 314 as sleeve 368 is put on and taken off. If a soft metal is used to make sleeve 368, sleeve 368 can be coated with a layer 370 of silicon or other coating that can protect sleeve 368 from grit blasting. Coating sleeve 368 with silicon or other resilient coating can extend the life of the sleeve such that it can be reused.

Once tooling 350 is positioned on inlet valve 300, inlet valve 300 is grit blasted using blasting tool 372 to roughen the surface of the unmasked portion. Equipment used to grit blast (i.e., sand blast) metals are known in the art. An example of a suitable grit is aluminum oxide. The grit size is typically in a range from about 80 grit to about 200 grit. Grit blasting is carried out for sufficient time to roughen the surface with minimal removal of material. Once grit blasting is complete, tooling 350 is removed and inlet valve 300 is sprayed clean with air. Grit blasting results in a roughened area 336 (FIG. 6).

Figure 6:
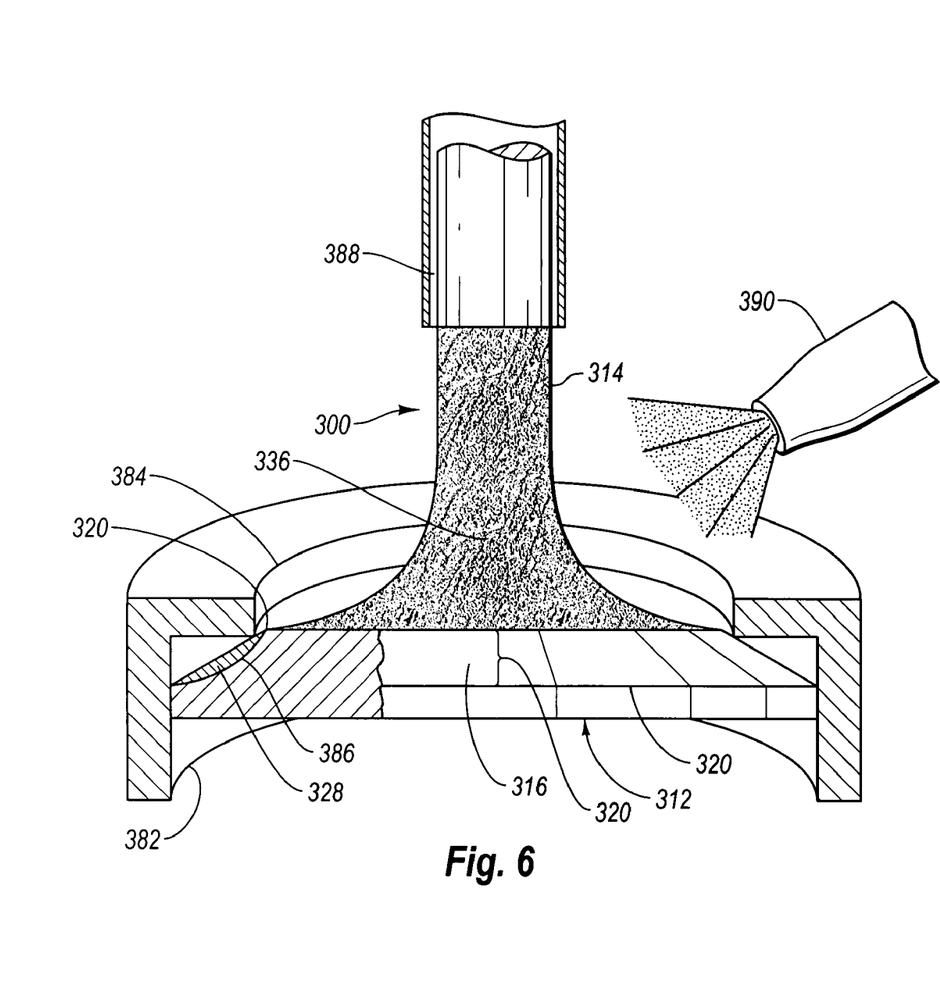
FIG. 6 shows the inlet valve of FIG. 5 and masking tooling for application of the protective coating.

FIG. 6 illustrates exemplary masking tooling 380 that can be used to mask valve 300 for purposes of applying the protective coating to the roughened area 336 of valve 300. Masking tooling can be a single ring having an aperture therethrough for receiving valve head 312. Masking tooling 380 has a first aperture 382 with a width that is slightly larger than the width of valve head 312 such that masking tooling 380 can be slidably received over valve head 312. A second aperture 384 is sized and configured to engage the seat face 320 so as to leave the roughened area 336 exposed. An edge 386 of masking tooling 386 engages the seating face 320 on the cladding so as to leave the cladding-body interface 320 exposed while covering the valve seat 316.

Valve stem 314 is also masked using sleeve 388. The length of sleeve 388 is selected to match the grit blasting masking, thereby leaving roughened area 336 exposed. Sleeve 388 is preferably made from a soft metal such as aluminum to avoid damaging valve stem 314.

Once tooling 380 and sleeve 388 are in place, a protective coating is applied to the roughened area 336. In a preferred embodiment, the uncured coating is sprayed onto roughened area 336 using spray nozzle 390. In an exemplary embodiment a single thin coating of material is applied by rotating inlet valve 300. The protective coating is then cured using any known technique. Examples of suitable curing techniques include conduction, convection, infrared radiation heating, and/or air drying.

Sleeve 388 and tooling 380 can be coated with a non-stick coating to hinder the bonding or adhesion of the protective coating to the tooling and sleeve. Examples of suitable non-stick coatings include polyfluorocarbons. Preventing the protective coating from adhering to the tooling and/or sleeve allows these parts to be reused for coating additional parts.

The method of the present invention provides an economic and rapid method for coating an inlet valve with a protective coating. The protective coating of the present invention is advantageously applied over the cladding-body interface to prevent corrosion at the cladding-body interface. The tooling 350 and masking tooling 380 can be designed and machined to ensure that the cladding-body interface is covered with the protective coating.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An inlet valve for use in an internal combustion engine, comprising:
    a valve stem;
    a valve head connected to the valve stem, the valve head comprising,
        a valve head body comprising a metallic material; and
        a cladding comprised of a hard cladding material that is harder than the metallic material covering a portion of the valve head body, at least a portion of the surface of the cladding forming a valve seat,
        wherein the cladding and the metallic material abut one another, thereby forming a cladding-body interface; and
    a protective coating bonded to the valve head and overlapping the cladding-body interface,
    the protective coating differing from both the metallic material of the valve head body and the hard cladding material of the cladding so that the protective coating, metallic material, and hard cladding material comprise three different materials disposed in three different regions.

2. An inlet valve as in claim 1, the valve head having a bell region, wherein the protective coating covers substantially the entire bell region.

3. An inlet valve as in claim 1, wherein a first edge of the protective coating begins on the cladding at least about 5 thousands of an inch away from the cladding-body interface.

4. An inlet valve as in claim 1, wherein the hard cladding material comprises a metal alloy that is harder than the metallic material of the valve head body.

5. An inlet valve as in claim 4, wherein the hard cladding material comprises a cobalt-chromium alloy.

6. An inlet valve as in claim 1, wherein the metallic material comprises steel.

7. An inlet valve as in claim 1, wherein the protective coating has a thickness in a range from about 0.0002 inches to about 0.002 inches.

8. An inlet valve as in claim 1, wherein the protective coating continuously covers the cladding-body interface.

9. An internal combustion engine comprising an inlet valve as defined in claim 1.

10. An inlet valve for use in an internal combustion engine, comprising:
    a valve stem;
    a valve head connected to the valve stem, the valve head comprising,
        a valve head body comprising steel; and
        a metal alloy cladding covering a portion of the valve head body, at least a portion of the surface of the cladding forming an annular valve seat,
        wherein the metal alloy cladding and the steel abut one another, thereby forming an annular cladding-body interface near the annular valve seat; and
    a protective coating bonded to the valve head and overlapping the cladding-body interface, a first edge of the protective coating beginning on the cladding at least about 5 thousands of an inch away from the cladding-body interface and terminating at a second edge that is on the valve stem,
    the protective coating differing from both the steel of the valve head body and the metal alloy cladding so that the protective coating, steel, and metal alloy cladding comprise three different materials disposed in three different regions.

11. An inlet valve as in claim 10, wherein the protective coating begins on the cladding at least 15 thousands of an inch away from the cladding-body interface.

12. An inlet valve as in claim 11, wherein a first edge of the protective coating begins on the cladding at least about 15 thousands of an inch away from the cladding-body interface.

13. An inlet valve as in claim 11, wherein a first edge of the protective coating begins on the cladding at least about 30 thousands of an inch away from the cladding-body interface.

14. An inlet valve as in claim 10, wherein the protective coating begins on the cladding at least 30 thousands of an inch away from the cladding-body interface.

15. An internal combustion engine comprising an inlet valve as defined in claim 10.

16. An internal combustion engine, comprising:
    a cylinder block comprising at least one combustion chamber;
    a piston movable within the at least one combustion chamber;
    at least one air inlet into the least one combustion chamber defining an inlet port configured to receive an inlet valve;
    an inlet valve positioned within the at least one inlet port for selectively opening and closing the inlet port, the inlet valve comprising a valve stem and a valve head, the valve head comprising,
        a valve head body comprising steel; and
        a cladding comprised of a hard cladding material that is harder than steel covering a portion of the valve head body, at least a portion of the surface of the cladding forming a valve seat,
        wherein the cladding and the steel form a cladding-body interface; and
    a protective coating bonded to the valve head and overlapping the cladding-body interface,
    the protective coating differing from both the steel of the valve head body and the hard cladding material of the cladding so that the protective coating, steel, and hard cladding material comprise three different materials disposed in three different regions.

17. An internal combustion engine as in claim 16, further comprising an exhaust gas recirculation system.

18. An internal combustion engine as in claim 16, wherein the coating covers substantially all of the valve head that is within the inlet port and in the gas path.

19. An internal combustion engine as in claim 16, wherein the protective coating overlaps the cladding-body interface by at least about 5 thousands of an inch on both sides thereof.

20. An article comprising the internal combustion engine of claim 16, wherein the article is selected from the group consisting of a ship, an automobile, or an electric generator.

* * * * *

UNITED STATES PATENT AND TRADEMARK OFFICE
CERTIFICATE OF CORRECTION

PATENT NO. : 7,562,647 B2
APPLICATION NO. : 11/394291
DATED : July 21, 2009
INVENTOR(S) : Burton et al.

It is certified that error appears in the above-identified patent and that said Letters Patent is hereby corrected as shown below:

Column 1
Lines 30, 31, 32, change "inlet valve 10" to --inlet valve 100--

Column 2
Line 10, change "inlet valve 10" to --inlet valve 100--

Column 4
Lines 35 and 40, change "valve stem 114" to --valve stem 14--

Column 5
Lines 26, 27, and 30, change "valve stem 114" to --valve stem 14--

Column 6
Lines 33 and 38, change "valve stem 114" to --valve stem 14--
Line 36, change "Inca" to --In a--
Line 44, change "the" to --than--

Column 7
Line 55, before "all" delete "the"

Column 9
Line 6, change "valve 101" to --valve 100--
Line 60, change "tooling 386" to --tooling 380--

UNITED STATES PATENT AND TRADEMARK OFFICE
CERTIFICATE OF CORRECTION

PATENT NO. : 7,562,647 B2
APPLICATION NO. : 11/394291
DATED : July 21, 2009
INVENTOR(S) : Burton et al.

It is certified that error appears in the above-identified patent and that said Letters Patent is hereby corrected as shown below:

Column 12
Line 50, change "the least" to --the at least--

Signed and Sealed this

Twenty-ninth Day of December, 2009

David J. Kappos
*Director of the United States Patent and Trademark Office*